Sept. 26, 1939.   H. L. WHISNER   2,174,298
STENCILING APPARATUS
Filed May 6, 1938   2 Sheets-Sheet 2

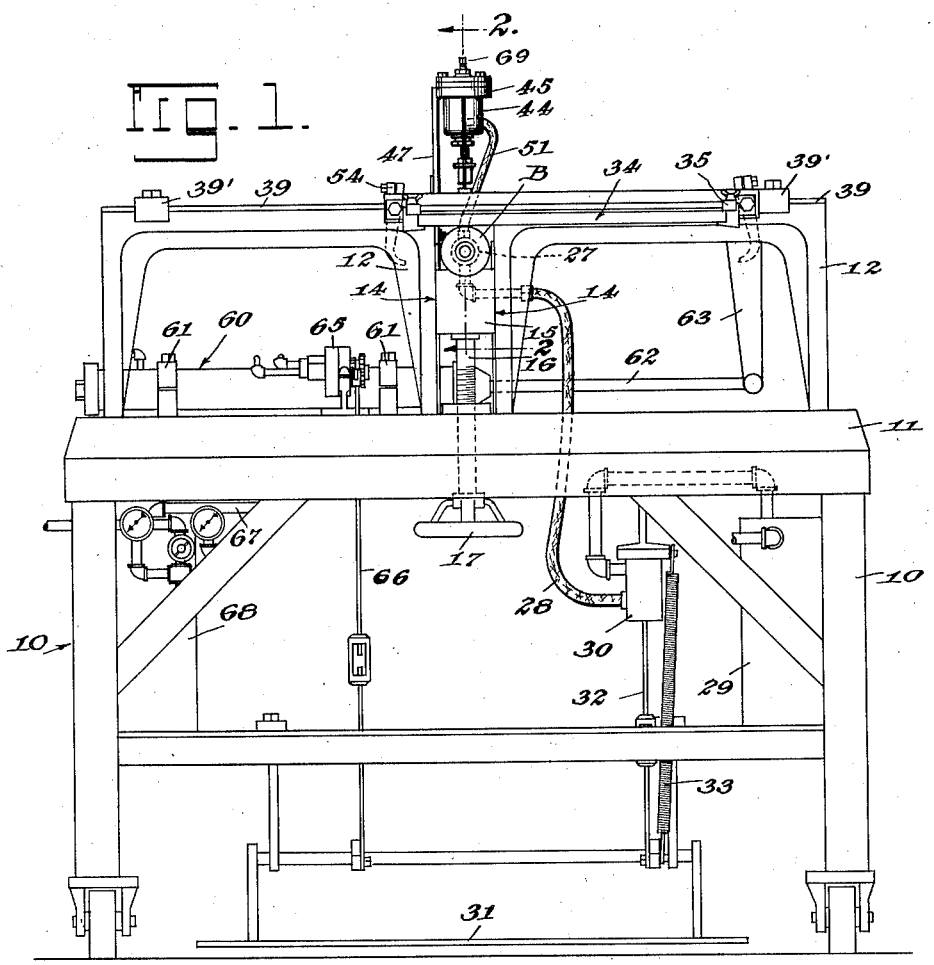
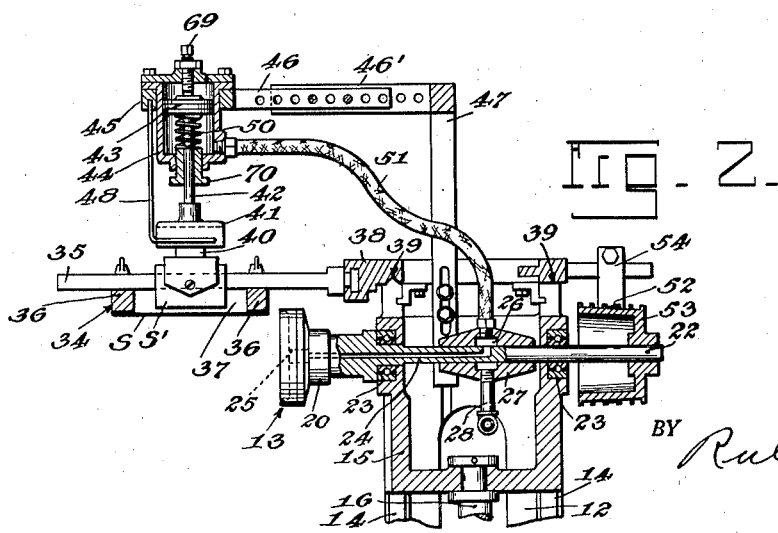

INVENTOR.
H. L. WHISNER.
BY Rule & Hoge
ATTORNEYS.

Patented Sept. 26, 1939

2,174,298

UNITED STATES PATENT OFFICE 2,174,298

STENCILING APPARATUS

Harry Lee Whisner, Clarion, Pa., assignor to Owens-Illinois Glass Company, a corporation of Ohio Application May 6, 1938, Serial No. 206,389

5 Claims. (Cl. 101—124)

The present invention relates to improvements in apparatus for stenciling the surfaces of various articles, particularly articles having curved surfaces such as bottles, jars and the like. More specifically the invention relates to that type of stenciling apparatus wherein the articles undergoing decoration are supported horizontally on a rotatable chuck by the application of vacuum to the chuck and wherein a vitreous enamel composition is forced through the interstices of a stencil screen which makes tangential rolling line contact with the articles on the chuck by the spreading action of a squeegee.

In the operation of this type of apparatus it occasionally happens that after the operator has placed a bottle or other article on the chuck and has commenced the decorating operation, the bottle falls from the chuck, either because it has been improperly positioned thereon or because the bottle is defective. Since the bottle forms a support for the squeegee through the moving stencil screen, when the bottle falls from the chuck the weight of the squeegee must be borne directly by the screen and in this event the screen becomes distorted and sometimes torn, while at the same time the enamel composition invariably is forced through the screen and such of it as does not fall to the undercarriage of the machine or to the floor adheres to the underneath side of the screen so that the next succeeding article placed in the chuck becomes smeared with the composition when the screen is brought into juxtaposition therewith.

The principal object of the invention is to provide a stenciling apparatus of the type set forth above in which the squeegee is normally supported in an elevated position out of contact with the screen, a vacuum cylinder being connected in series with the vacuum chuck in such a manner that the exclusion of atmospheric pressure to the vacuum line caused by placing a bottle on the chuck will operate to apply a vacuum to the cylinder and lower the squeegee into decorating relation to the screen, while conversely, the admission of atmospheric pressure to the vacuum line by the removal, or falling, of the bottle will operate to relieve the vacuum in the cylinder and permit the squeegee to be elevated from the screen.

Other objects of the invention not at this time particularly enumerated will become apparent hereinafter.

Fig. 1 is a front elevational view of a stenciling apparatus manufactured in accordance with the principles of the present invention;

Fig. 2 is a sectional view taken substantially along the line 2—2 of Fig. 1;

Figures 3, 4:
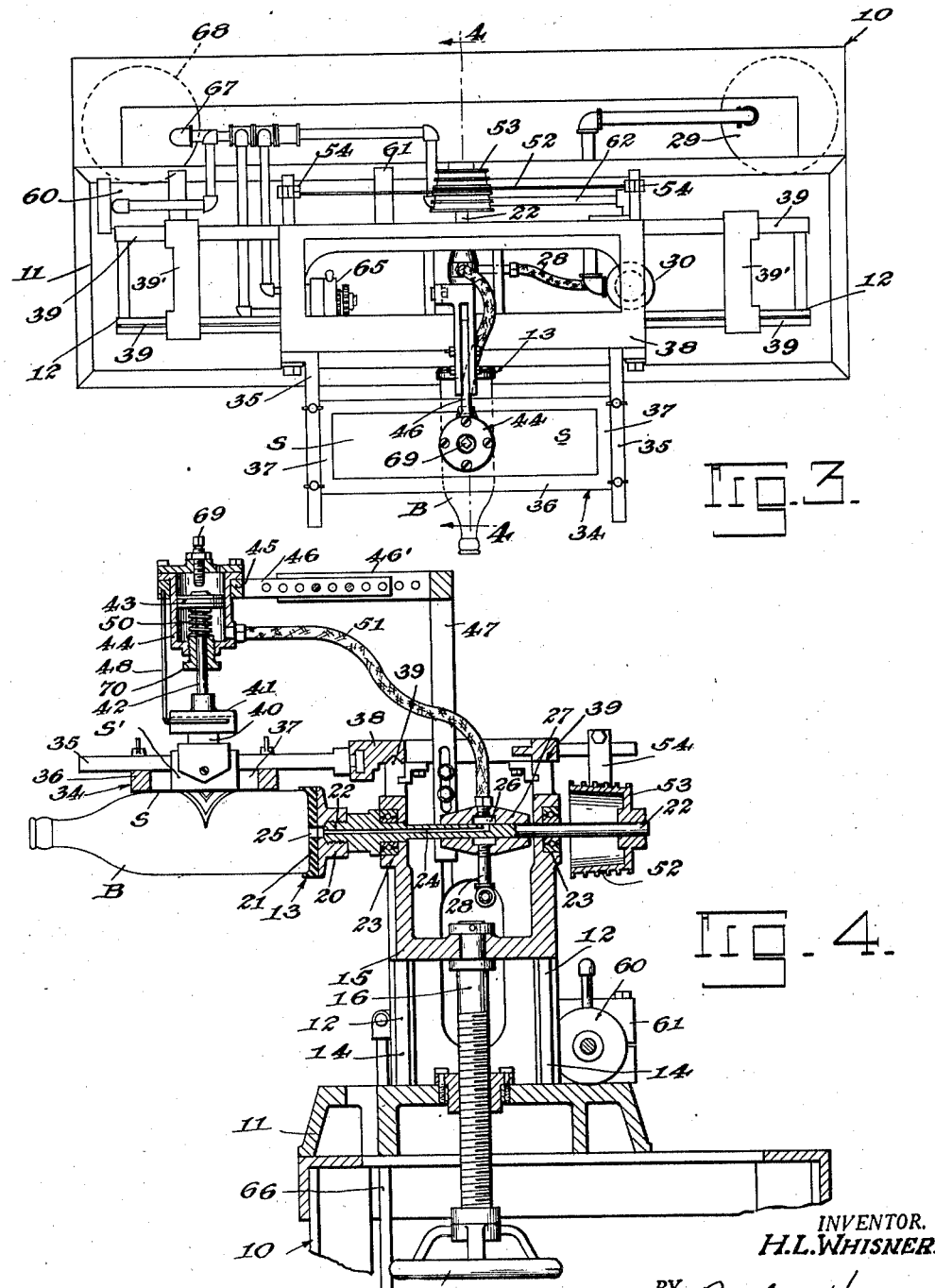
Fig. 3 is a top plan view of the apparatus.
Fig. 4 is a sectional view taken substantially along the line 4—4 of Fig. 3 with certain parts being shown in full elevation.

The invention has been illustrated in connection with a more or less conventional type of stenciling apparatus including a rotary chuck designed to support a bottle or similar container in a recumbent position beneath a screen through which the vitreous enamel composition or coloring material is forced and applied to the bottle during rotation of the latter and horizontal movement of the screen. The screen and its supporting frame are reciprocated horizontally relative to the bottle or other container by an air operated piston motor. Operation of both the piston motor and bottle holding chuck is controlled by a single manually operated device as for example a foot treadle. An example of this general type of stenciling apparatus is disclosed in the United States patent to David Denelsbeck, No. 2,113,576, issued April 12, 1938, for Apparatus for marking articles, and reference may be had thereto for disclosure of certain instrumentalities not fully disclosed herein.

Specifically the present apparatus includes a wheeled base 10 carrying a platform 11, or table, the latter supporting frames 12 designed to carry the bottle chuck 13 and parts directly associated therewith as will be apparent presently. The frames 12 are substantially inverted U-shape in side elevation (Fig. 1) and include a pair of vertical slideways 14 at their inner ends, said slideways being spaced apart in the direction of the length of the platform 11 and adapted to accommodate a slide 15 upon which the bottle chuck 13 is mounted. An adjusting screw 16, and hand wheel 17 at the lower end thereof, provide means whereby the elevation of the chuck may be varied to compensate for variations in the diameter of bottles or other such articles being decorated.

The chuck 13 includes a holder 20 (Fig. 4) which is provided with a resilient sealing pad 21 or face plate adapted to receive thereagainst the base of a bottle B or other article to be decorated. The holder 20 is threadedly received on the forward end of a hollow shaft 22 which is supported in bearings 23 at the upper end of the slide 15. The passageway 24 in the shaft 22 communicates at the forward end thereof with an opening 25 provided centrally through the holder 20 and pad 21, and also communicates near the middle of the shaft with an internal annular groove 26 formed in a stationary sleeve 27 which surrounds a portion of the shaft between the bearings 23. A supply pipe 28 connects the annular groove 26 with a vacuum tank 29 (Fig. 1) by way of a treadle operated valve 30 through which the application of vacuum to the chuck is controlled. A treadle 31 is operatively connected to the valve 30 by means of a rod 32. A coil spring 33 normally holds the valve 30 in position to break communication between the chuck 13 and the vacuum tank 29.

A screen frame 34 carrying a screen S is attached to a pair of horizontal arms 35 and is disposed immediately above the position occupied by the bottle B which is to be decorated, said frame in this instance including a pair of longitudinal side bars 36 connected by end members 37. The arms 35 which directly support the screen 34 extend from one side of a slide 38 which is mounted for horizontal movement in the direction of length of the platform 11, in horizontal slideways 39, the latter provided at the upper side of the frames 12. Stops 39' near the opposite ends of the slideways limit the extent of reciprocating movement of the slide 38.

In order to force coloring material through the screen S, a squeegee S' or wiper depends from an arm 40 (Fig. 4) which is suspended from a guide 41 carried by the lower end of a piston rod 42. The piston rod 42 is connected to a piston 43 mounted in a cylinder 44 which is carried in a frame 45 at the outer end of a horizontal arm 46. The arm 46 is secured to a horizontal bifurcated arm 46' provided on a vertical support 47 which in turn is secured for vertical adjustment to one of the frames 12. The squeegee S' extends transversely of the screen S and in order to prevent turning movement of the former about the axis of the piston rod 42, the guide 41 is disposed between a pair of horizontally extending bifurcations provided at the lower end of a bracket 48 secured to the frame 45.

The squeegee S' is normally maintained elevated from the stencil screen by means of a coil spring 50 which is disposed in the cylinder 44 and surrounds the piston rod 42. The cylinder 44 is connected at a point below the piston 43 with the annular groove 26 provided in the stationary sleeve 27 by means of a flexible conduit 51. Thus it will be seen that the cylinder 44 and vacuum chuck 13 are connected in series in such a manner that it is essential to the application of vacuum to the cylinder that a bottle B be placed upon the chuck. Otherwise the application of vacuum to the groove 26 will draw air at atmospheric pressure directly from the chuck, thus relieving the application of vacuum to the cylinder until such time as the opening 25 is sealed, for example, by placing a bottle upon the chuck. An adjusting screw 69 limits the upward travel of the piston 43 in the cylinder 44 and consequently determines the height to which the squeegee is lifted from the screen. An adjustable nipple 70 is threaded in the base of the cylinder 44 for the purpose of varying the tension of the coil spring so as to vary the pressure exerted by the squeegee on the stencil screen.

Reciprocation of the screen frame and oscillation of the bottle B about its longitudinal axis are synchronized by providing driving connections between the slide 38 and the hollow shaft 22. Toward this end, a cord 52 (Fig. 3) is wrapped about a pulley 53 which is mounted on the shaft 22 and has its opposite ends suitably secured to brackets 54 or arms which are carried by the slide 38. Thus, it is apparent that reciprocation of the slide 38 operates through the cord 52 to oscillate the pulley 53. Corresponding oscillatory movement is thereby imparted to the chuck 13 and bottle B supported therein.

Reciprocation of the slide 38 is obtained by means of a fluid operated piston motor 60 which is mounted upon the platform 11 and secured thereto by means of holders 61 or clamps. The piston rod 62 is connected by means of an arm 63 to the slide 38.

Air under pressure is supplied to the opposite ends of the motor cylinder 60 by means of a ratchet-actuated control valve 65 which is connected to the foot treadle 31 by means of a rod 66 and which operates to alternately direct the air from a supply pipe 67 leading from a source 68 to the opposite sides of the cylinder 60. The ratchet-actuated control valve and its associated instrumentalities, together with the system of air pressure piping by means of which the piston motor 60 is actuated forms no part of the present invention and no claim is made herein to any novelty connected therewith. Such a control mechanism is shown and described in the above mentioned patent to Denelsbeck and reference may be had thereto for a full disclosure of this control mechanism and for its operation.

In the operation of the apparatus, prior to the placing of a bottle B on the chuck 13 the coil spring maintains the squeegee S' elevated and out of contact with the stencil screen S. The operator applies a bottle to the chuck 13 and simultaneously depresses the treadle 31 thus actuating the control valve 30 and admitting vacuum to the groove 26 in the stationary sleeve 27. The opening 25 in the chuck 13 being closed by the presence of a bottle on the chuck, vacuum is applied to the cylinder 44 and the squeegee S' is lowered into decorating contact with the screen. Automatically, and with no operation on the part of the operator other than the initial depressing of the treadle 31, the ratchet-actuated control valve 65 is set into operation in the manner disclosed in the above mentioned patent to Denelsbeck and, owing to the driving connection between the screen frame and the pulley 53 through the cord 52, the chuck is oscillated in synchronism with the reciprocating movement of the screen frame. The squeegee functions as is customary to force the coloring material through the screen at the previous portions thereof whereby material is applied to the bottle. Upon completion of one decorating operation, another bottle is placed in the chuck and the operation of the screen, chuck and squeegee is repeated with the screen moving in the opposite direction.

Should for any reason whatsoever, as for example the improper positioning of a bottle on the chuck 13 or the positioning of a defective bottle thereon, a bottle fall from the chuck prior to commencement of the decorating stroke of the screen but after the operator has depressed the treadle 31, the screen will perform its stroke in the usual manner but the squeegee S' will not be lowered into contact therewith and no harm will result. Likewise, should the bottle fall after the decorating operation has commenced thereon, the vacuum existing in the cylinder 44 will immediately be relieved by the uncovering of the opening 25 and the spring 50 will operate to elevate the squeegee before it has had time to damage the moving screen.

Modifications may be resorted to within the spirit and scope of the appended claims.

I claim:

1. A stenciling apparatus comprising a horizontally reciprocable stencil screen, a chuck adapted to support a cylindrical body beneath the screen in tangential rolling line contact therewith, a squeegee for the screen positioned above the same and normally out of contact therewith, said squeegee being movable into decorating contact with the screen, vacuum operated means for moving the squeegee into such contact, and means for reciprocating the screen.

2. A stenciling apparatus comprising a horizontally reciprocable stencil screen, a chuck adapted to support a cylindrical body beneath the screen in tangential rolling line contact therewith, a squeegee for the screen positioned above the same and normally out of contact therewith, said squeegee being movable into decorating contact with the screen, a vacuum cylinder, a piston in the cylinder, means connecting the piston and squeegee, and means for applying a vacuum to the cylinder to actuate the piston therein and move the squeegee into decorating contact with the screen.

3. A stenciling apparatus comprising a horizontally reciprocable stencil screen, a vacuum chuck adapted to support a cylindrical body beneath the screen in tangential rolling line contact therewith, a squeegee for the screen positioned above the same and normally out of contact therewith, said squeegee being movable into decorating contact with the screen, means operable upon the application of vacuum thereto for moving the squeegee into such contact, a vacuum control valve, and means connecting said chuck and squeegee moving means in series to the control valve.

4. A stenciling apparatus comprising a horizontally reciprocable stencil screen, a vacuum chuck adapted to support a cylindrical body beneath the screen in tangential rolling line contact therewith, a squeegee for the screen positioned above the same, said squeegee being movable toward and away from the screen into and out of decorating engagement therewith, a vacuum cylinder, a piston in the cylinder, means connecting the piston to the squeegee, means normally urging the piston in one direction in the cylinder to maintain the squeegee out of engagement with the screen, a vacuum control valve, and means connecting said chuck and cylinder in series to the control valve.

5. In a decorating apparatus of the character described, a stencil screen, a chuck adapted to support a cylindrical body beneath the screen in tangential rolling line contact therewith, a squeegee for the screen positioned above the same, said squeegee being movable toward and away from the screen into and out of decorating contact therewith, spring means normally urging said squeegee out of contact with the screen, means for moving the squeegee into decorating contact with the screen and for maintaining the same in such contact against the action of said spring means, and means operable in the absence of a body on the chuck for rendering said last mentioned means inoperative.

HARRY LEE WHISNER.